United States Patent Office 2,842,447
Patented July 8, 1958

2,842,447
METHOD OF MAKING A REFRACTORY BODY AND ARTICLE MADE THEREBY

Leon R. Schlotzhauer and Kenneth T. Wood, Painted Post, N. Y., assignors to Corning Glass Works, Corning, N. Y., a corporation of New York No Drawing. Application September 29, 1955
Serial No. 537,560

5 Claims. (Cl. 106—57)

The invention relates to a novel method of making ceramic refractory bodies essentially composed, on the oxide basis, of zirconia ($ZrO_2$), alumina ($Al_2O_3$), and silica ($SiO_2$), containing substantial amounts of finely crystalline mullite ($Al_6Si_2O_{13}$) and zirconia, and having high thermal stability and corrosion resistance.

Bodies containing primarily $ZrO_2$, $Al_2O_3$, and $SiO_2$ may be made by fusing batches comprising a zirconium mineral such as zirkite (impure zirconia) or zircon ($ZrSiO_4$), and a mineral or minerals containing $Al_2O_3$ and $SiO_2$, such as clay, or bauxite or diaspore and quartz. In such bodies, however, the $SiO_2$, instead of being combined with $Al_2O_3$ as mullite, forms glassy matrix. Such glassy matrix inherently amounts to 10% or more and includes the metal oxides which occur as impurities in the minerals and ores utilized in the batches; and, at high temperatures it may exude whereby to contaminate the molten glass in contact therewith and to render the refractory bodies porous.

During the cooling of such a fused refractory body the exterior solidifies first and the subsequent solidification of the interior is accompanied by shrinkage and the formation of pipe or voids, and the crystals adjacent such voids are extremely coarse and poorly bonded as compared to the crystals in the outer layer which are relatively fine.

It is an object of this invention to produce a sintered, homogeneous, finely crystalline body containing mullite and zirconia, which, on the oxide basis, consists essentially of $ZrO_2$, $Al_2O_3$, and $SiO_2$, and which is free of voids, impurities and glassy matrix.

We have now discovered that under proper conditions and by a sintering process instead of fusion, zircon can be made to react completely with alumina to form fine needle-like mullite crystals interspersed with the zirconia.

The new method according to the invention comprises making an intimate mixture consisting essentially of finely divided zircon ($ZrSiO_4$) and finely divided alumina ($Al_2O_3$) in the proportions of 20% to 65% $ZrSiO_4$ and 80% to 35% $Al_2O_3$ by weight respectively, molding the mixture to form a body, and reacting the constituents by sintering the body without fusion above 1500° but not above about 1800° C. until the reaction is substantially complete. The reaction is believed to proceed according to the equation $$2ZrSiO_4 + 3Al_2O_3 = 2ZrO_2 + Al_6Si_2O_{13}$$

We have found that the reaction of zircon with alumina to form zirconia and mullite will be substantially complete if the zircon and alumina are finely divided, say 200 mesh or finer, and intimately mixed and are thereafter heated between about 1500° and 1800° C. If the materials are substantially coarser than 200 mesh or are not intimately mixed, the speed of reaction will be substantially slower and, if one or both of the materials is too coarse say 14 mesh or coarser, portions of one or both of the ingredients will remain unreacted. A glassy matrix of free $SiO_2$ results if the body is heated above the melting point of mullite, 1810° C. The practical maximum temperature, however, is about 1650° C., since this causes complete reaction and special equipment is otherwise necessary for substantially higher temperatures. While the reaction is incomplete at temperatures much below 1500° C. and does not proceed at all at temperatures below 1400° C., it can be accelerated to some extent by the addition to the batch of a small amount, up to 5%, of a mineralizer.

The action of mineralizers in causing recrystallization of ceramic bodies when heated is well known and many materials are known which act as mineralizers. Among those which facilitate the combination of alumina and silica to form crystalline mullite and which are suitable for the present purpose may be mentioned, $TiO_2$, $CaF_2$, $MgF_2$, $AlF_3$, $LiF$, $B_2O_3$, $ZnO$, $FeO$, $MnO$, $MoO_3$, and $CeO_2$. The addition of one or more of these to the batch substantially facilitates the reaction and does not materially change the fundamental character of the final product. We have found that $TiO_2$ is particularly efficacious.

If the batch consists essentially of finely divided alumina and zircon in stoichiometric proportions according to the above mentioned reaction and is compounded and treated in the manner described, the resulting product will be composed of an intimate, homogeneous, intercrystallized mixture of zirconia and mullite.

If, instead of stoichiometric proportions, the batch contains an excess of alumina such excess alumina will be dispersed as corundum in the zirconia-mullite mixture; and if the batch contains an excess of zircon, the excess zircon will be dispersed in the zirconia-mullite mixture.

In Table I there are shown, as calculated to the nearest 0.5%, the batches for the specific stoichiometric proportions of zircon and alumina and for the broad range of their proportions within the scope of the invention together with the corresponding compositions of the reaction products on the oxide basis and on the crystal basis.

Table I

| Batch | Proportions by weight | |
|---|---|---|
| | Stoichiometric | Range |
| Zircon | 54.5 | 20–65 |
| Alumina | 45.5 | 35–80 |
| Product (Oxide Basis): | | |
| $ZrO_2$ | 36.5 | 13.5–43.5 |
| $Al_2O_3$ | 45.5 | 80–35 |
| $SiO_2$ | 18 | 6.5–21.5 |
| Product (Crystal Basis): | | |
| Zirconia | 36.5 | 13.5–28.2 |
| Mullite | 63.5 | 23.5–48.5 |
| Corundum | | 63–0 |
| Zircon | | 0–23 |

It is seen that, when the proportions of the batch are stoichiometric, the weight ratios, $ZrO_2$ to $Al_2O_3$ to $SiO_2$ on the oxide basis, are about 2 to 2.5 to 1 respectively. In the crystalline product the mol ratio of zirconia to mullite throughout the range is about 2 to 1.

While such a body, containing corundum or zircon and resulting from a batch containing an excess of alumina or of zircon within the range of percentages referred to above, exhibits at least some of the benefits of the invention, a body resulting from a batch containing stoichiometric proportions of zircon and alumina is particularly desirable since it is composed essentially of zirconia and mullite and has optimum corrosion resistance.

Microscopic and petrographic examination of the reaction products resulting from the new method show that, when the batch materials are in the stoichiometric proportions, the product consists essentially of spherically shaped aggregates of crystals of zirconia about 4 to 10 microns in diameter and needle-like crystals of mullite, the zirconia aggregates being dispersed and separated by the mullite crystals. On the other hand, when either the zircon or the alumina in the batch is in excess of the stoichiometric proportions, only the excess will appear as crystals thereof dispersed among the zirconia and mullite crystals. In either event, no substantial amount of free silica nor of silicates other than mullite is present in the reaction products.

Refractory bodies resulting from the method of the invention have high thermal stability and do not dissociate nor form a glassy matrix at temperatures up to the melting point of mullite. Their high corrosion resistance is believed to be due in part to the absence of glassy matrix. Moreover, although zirconia is a constituent of the products, they do not exhibit the tendency to crack due to inversion of $ZrO_2$ when heated or cooled through 1000° C., which is characteristic of prior bodies containing substantial amounts of zirconia per se. This advantageous feature is believed to be due to the fact that the zirconia crystalline aggregates are individually isolated by the mullite crystals.

In Table II there are shown by way of example the compositions in percent by weight of batches falling within the broad scope of the invention and their corresponding compositions on the oxide basis and on the crystal basis, and also the rate of corrosion of each composition in millimeters per hour by a molten soda lime silicate glass in contact therewith at 1500° C. Molten soda lime silicate glasses are particularly corrosive towards refractory bodies of this general type of composition and bodies having a corrosion rate exceeding about 0.055 mm. per hour are considered unsuitable for the present purpose.

composed of a sintered mullite refractory composition containing approximately 65% $Al_2O_3$ and 33% $SiO_2$ on the oxide basis, when similarly tested exhibited a corrosion rate greater than 0.2 mm. per hours. It is seen, therefore, that bodies containing an excess of alumina as corundum are more corrosion-resistant and desirable than bodies containing a comparable excess of zircon, and that compositions of substantially stoichiometric proportions are most desirable.

The refractory bodies produced by the method of the invention may be molded by various well known methods. Preferably, they are slip cast by forming a slip of the finely divided batch materials in water in the proportions of about 85 to 87% by weight of solids and pouring the slip into a porous mold composed of plaster or other suitable material. A small amount, say 0.1–0.2%, of a deflocculant, such as sodium silicate, is preferably included in the slip. When the casting has solidified, it is removed from the mold and dried slowly at room temperature and is then heated slowly to about 1550° C. and held for 24 hours. Any tendency for the formation of cracks during the drying and firing of the cast article may be avoided by including in the batch up to 20% by weight of grog prepared by firing the necessary amount of a similar batch at the above-mentioned time and temperature and pulverizing the fired material to the desired grain size.

Other methods of forming the bodies include ramming or pressing the batch into a mold, the amount of water in the batch being sufficient only to moisten it and make it coherent. By utilizing prefired grog of ap-

*Table II*

| Batch | 1 | 2 | 3 | 4 | 5 | 6 | 7 | 8 | 9 | 10 | 11 |
|---|---|---|---|---|---|---|---|---|---|---|---|
| Zircon | 65 | 59 | 54 | 54.5 | 49 | 44 | 39 | 19 | 4 | ------ | 79 |
| Alumina | 34 | 40 | 45 | 45.5 | 50 | 55 | 60 | 80 | 95 | 100 | 20 |
| TiO₂ | 1 | 1 | 1 | ------ | 1 | 1 | 1 | 1 | 1 | ------ | 1 |
| Oxide Composition: | | | | | | | | | | | |
| ZrO₂ | 43.6 | 39.6 | 36.3 | 36.6 | 32.9 | 29.6 | 26.2 | 12.8 | 2.7 | ------ | 53.1 |
| Al₂O₃ | 34 | 40 | 45 | 45.5 | 50 | 55 | 60 | 80 | 95 | 100 | 20 |
| SiO₂ | 21.4 | 19.4 | 17.7 | 17.9 | 16.1 | 14.4 | 12.8 | 6.2 | 1.3 | ------ | 25.9 |
| TiO₂ | 1 | 1 | 1 | ------ | 1 | 1 | 1 | 1 | 1 | ------ | 1 |
| Crystal Composition: | | | | | | | | | | | |
| Zirconia | 27.4 | 32.2 | 36.3 | 36.6 | 32.9 | 29.5 | 26.2 | 12.8 | 2.7 | ------ | 16.1 |
| Mullite | 47.3 | 55.8 | 62.7 | 63.4 | 56.9 | 51.2 | 45.3 | 22.1 | 4.6 | ------ | 27.9 |
| Corundum | | | | | 9.2 | 18.3 | 27.5 | 64.1 | 91.7 | 100 | |
| Zircon | 24.3 | 11 | | | | | | | | | 55 |
| TiO₂ | 1 | 1 | 1 | | 1 | 1 | 1 | 1 | 1 | | 1 |
| Corrosion, mm./hour | .055 | .038 | .034 | .045 | .044 | .046 | .041 | .046 | .061 | .076 | .20 |

Examples 1–3, 5–9, and 11 contain $TiO_2$ which functions as a mineralizer. Examples 1 to 8 inclusive are within the broad range of the invention, Examples 3 and 4 being compositions of stoichiometric proportions.

Examples 9 to 11 inclusive, which are recited for comparison, are outside the scope of the invention.

The corrosion resistance of the compositions of the examples, expressed as the rate of corrosion in mm. per hour, was measured by suspending a specimen of the composition, 10 mm. x 10 mm. x 45 mm. long, from the cover of a platinum crucible substantially half full of molten soda-lime-silicate glass, the specimen being immersed throughout one half of its length in the glass. The crucible and its contents were then heated at 1500° C. for 24 hours. To obtain the corrosion rate the depth in mm. to which the specimen was dissolved at the metal line was divided by the number of hours.

The corrosion rates, of the compositions, of Examples 1 to 7 inclusive do not exceed 0.055 mm. per hour, that of Example 3 being the lowest. Such low corrosion rates are exceptionally good. On the other hand, the corrosion rates of Examples 9 to 11 exceed 0.055 mm. per hour, the composition containing a large excess of zircon (11) being much poorer in this respect that the compositions containing an even larger excess of alumina (9 and 10). In further comparison a similar specimen propriately selected grain size optimum packing may be attained.

Some shapes may, if desired, be formed by extrusion in known manner of a batch made suitably plastic by using the requisite amount of water and preferably a binding agent such as gum arabic or the like.

1. The method of making a highly refractory and corrosion resistant body which comprises making an intimate mixture consisting essentially of finely divided zircon and finely divided alumina in substantially the stoichiometric proportions of the equation $$2ZrSiO_4 + 3Al_2O_3 = 2ZrO_2 + Al_6Si_2O_{13}$$

and 1 to 5 wt. % of a mineralizer molding the mixture to form a body and reacting the constituents by sintering the body without fusion at a temperature above 1500° but not above about 1800° C. until the reaction is substantially complete.

2. A highly refractory and corrosion resistant sintered body consisting essentially on the oxide basis of $ZrO_2$, $Al_2O_3$, and $SiO_2$ in about the ratio by weight of 2 to 2.5 to 1 respectively, and consisting essentially of crystalline aggregates of $ZrO_2$ and crystals of mullite in a molar ratio of about 2 to 1 respectively, the aggregates of $ZrO_2$ being between 4 and 10 microns in diameter and being individually surrounded by and embedded in an interlacing network of mullite crystals of needle-like microstructure, the total $ZrO_2$, $Al_2O_3$, and $SiO_2$ amounting to at least 95% by weight.

3. A highly refractory and corrosion resistant sintered body consisting essentially by weight on the oxide basis of about 36.5 parts $ZrO_2$, 45.5 parts $Al_2O_3$, and 18 parts $SiO_2$, said body consisting essentially of crystalline aggregates of $ZrO_2$ and needle-like crystals of mullite in a molar ratio of about 2 to 1 respectively, said $ZrO_2$ aggregates having diameters of 4 to 10 microns, the $ZrO_2$ aggregates being individually surrounded by the mullite crystals.

4. The refractory body of claim 3 containing 1 to 5 parts by weight of a mineralizer.

5. The refractory body of claim 4 in which the mineralizer is $TiO_2$.

References Cited in the file of this patent

UNITED STATES PATENTS

| | | |
|---|---|---|
| 1,615,751 | Fulcher | Jan. 25, 1927 |
| 2,271,366 | Field | Jan. 27, 1942 |

FOREIGN PATENTS

| | | |
|---|---|---|
| 800,779 | France | 1936 |
| 664,943 | Germany | 1938 |

OTHER REFERENCES

Searle: Refractory Materials (London, 1950), pp. 147–148.